United States Patent
Song et al.

(10) Patent No.: US 11,184,047 B2
(45) Date of Patent: Nov. 23, 2021

(54) METHOD FOR ADJUSTING AN IMPEDANCE OF A TUNABLE MATCHING NETWORK

(71) Applicant: Stichting IMEC Nederland, Eindhoven (NL)

(72) Inventors: Minyoung Song, Eindhoven (NL); Yao-Hong Liu, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 51 days.

(21) Appl. No.: 16/911,938

(22) Filed: Jun. 25, 2020

(65) Prior Publication Data

US 2021/0036731 A1 Feb. 4, 2021

(30) Foreign Application Priority Data

Aug. 1, 2019 (EP) .................................... 19189610

(51) Int. Cl.
*H04B 1/40* (2015.01)
*H04B 1/10* (2006.01)
*H04L 25/02* (2006.01)

(52) U.S. Cl.
CPC ............ *H04B 1/40* (2013.01); *H04L 25/0278* (2013.01); *H04B 2001/1072* (2013.01)

(58) Field of Classification Search
CPC .... H04B 1/40; H04B 2001/1072; H04B 1/18; H04B 1/0458; H04B 1/44; H04B 1/525;
(Continued)

(56) References Cited

U.S. PATENT DOCUMENTS 6,845,126 B2 1/2005 Dent et al.
7,671,693 B2 * 3/2010 Brobston ................. H03H 7/40
333/17.3
(Continued)

FOREIGN PATENT DOCUMENTS

CA 2815672 C * 12/2016 ............... H01Q 5/50
WO WO-02063782 A2 * 8/2002 ............. H04B 1/005
WO WO-2012027703 A2 * 3/2012 ........... H04B 1/0458

OTHER PUBLICATIONS

Li, Z. Radio frequency circuits fortunable multi-band CMOS receivers for wireless LAN applications, 2004, (Order No. 3158832). Available from ProQuest Dissertations and Theses Professional. (305182864). Retrieved from https://dialog.proquest.com/professional/docview/305182864?accountid=131444 (Year: 2004).*

(Continued)

*Primary Examiner* — Lana N Le
(74) *Attorney, Agent, or Firm* — McDonnell Boehnen Hulbert & Berghoff LLP

(57) ABSTRACT

Example embodiments relate to methods for adjusting an impedance of a tunable matching network, One embodiment includes a method for adjusting an impedance of a tunable matching network (TMN) connected between an antenna and a transceiver front-end. The TMN includes a receive path to provide signals from the antenna to a receiver during a receive (Rx) mode and a transmit path to provide signals from a transmitter to the antenna during a transmit (Tx) mode. The method includes tuning the TMN. The method also includes measuring values of an output DC-offset at the receiver while tuning the TMN. The output DC-offset is caused by a coupling between the transmitter and the receiver. Further, the method includes determining a maximum value of the output DC-offset from the measured output DC-offset values. Additionally, the method includes (Continued)

adjusting the impedance of the TMN by tuning the TMN to the output DC-offset maximum value.

18 Claims, 7 Drawing Sheets

(58) Field of Classification Search
CPC .... H04B 5/0075; H04B 17/101; H04B 17/20; H04B 17/104; H04L 25/0278; H04L 27/20; H03H 7/38; H03H 7/40; H03J 2200/10; H03J 2200/06; H03J 2200/08; H04W 52/028; H03F 1/56; H03F 2200/318; H03F 3/24
USPC ... 455/193.1, 552.1, 553.1, 107, 248.1, 320, 455/330, 77, 120, 125, 150.1, 154.1, 455/160.1, 169.1, 177.1, 178.1, 127.4, 75, 455/84, 95
See application file for complete search history.

(56) References Cited

U.S. PATENT DOCUMENTS

| | | | | |
|---|---|---|---|---|
| 8,928,536 | B2* | 1/2015 | Knudsen | H04B 1/0458 343/702 |
| 8,989,677 | B2 | 3/2015 | Leinonen et al. | |
| 2004/0166804 | A1* | 8/2004 | Moloudi | H03H 21/0012 455/20 |
| 2009/0121963 | A1* | 5/2009 | Greene | H03H 7/40 343/861 |
| 2009/0253385 | A1* | 10/2009 | Dent | H04B 1/0458 455/83 |
| 2010/0203847 | A1* | 8/2010 | Gorbachov | H03H 7/38 455/84 |
| 2011/0299431 | A1* | 12/2011 | Mikhemar | H04B 1/18 370/277 |
| 2012/0171970 | A1* | 7/2012 | Muhammad | H04B 1/0458 455/84 |
| 2013/0109330 | A1* | 5/2013 | Sahota | H04B 1/525 455/77 |
| 2015/0270864 | A1* | 9/2015 | Bryant | H04B 1/525 370/282 |
| 2016/0277129 | A1* | 9/2016 | Manssen | H04B 1/18 |

OTHER PUBLICATIONS

European Search Report, EP Application No. 19189610.9, dated Feb. 6, 2020, 5 pages.

* cited by examiner

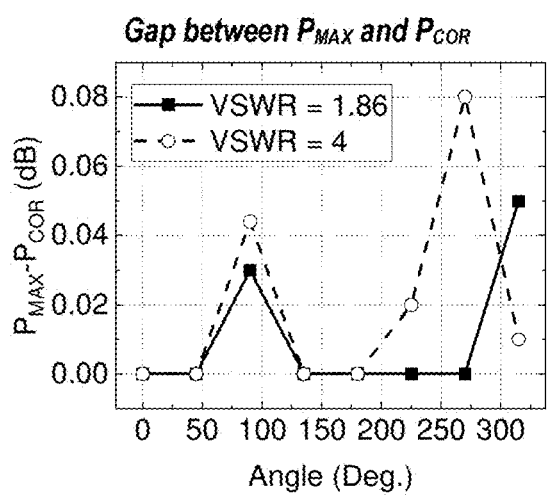 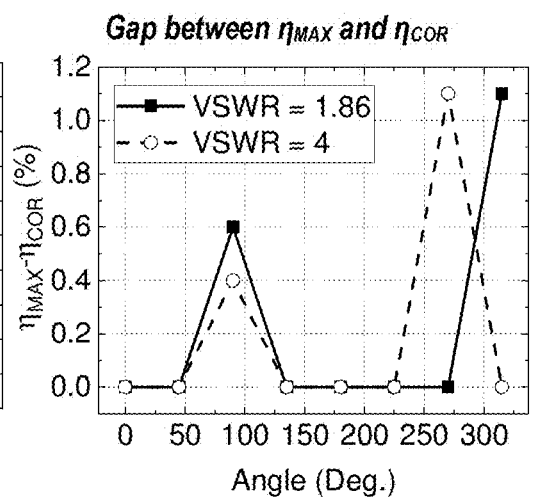
FIG. 7A FIG. 7B

METHOD FOR ADJUSTING AN IMPEDANCE OF A TUNABLE MATCHING NETWORK

CROSS-REFERENCE TO RELATED APPLICATIONS

The present application is a non-provisional patent application claiming priority to European Patent Application No. EP 19189610.9, filed Aug. 1, 2019, the contents of which are hereby incorporated by reference.

FIELD OF THE DISCLOSURE

The present disclosure relates to the field of transceivers. More particularly, the present disclosure relates to a transceiver comprising a tunable matching network (TMN) and a method for adjusting the TMN. The adjusting of the TMN bases on coupling, particularly caused by self-mixing, between a transmitter and receiver of the transceiver.

BACKGROUND

A wireless device may generally include a wireless transceiver for transmitting and receiving data in a wireless communication system. For data transmission, the transceiver may modulate a radio frequency (RF) carrier signal with data to obtain a modulated signal, amplify the modulated signal to obtain an output RF signal having a chosen output power level, and transmit the output RF signal via an antenna, for example, to another wireless device or base station. The transceiver may include various circuits for transmitting the data, including amplifiers, local oscillators, mixers, and filters.

For data reception, the transceiver may receive an RF signal via the antenna, amplify the received RF signal, and demodulate the amplified signal to decode or recover the data contained therein. The transceiver may further include various circuits for receiving data, such as amplifiers, filters, or demodulators. Some transceivers include a power amplifier (PA) in the transmit path and a low noise amplifier (LNA) in the receive path of the transceiver front-end, which are used for amplifying the transmitted and received signals, respectively.

Impedance matching is generally used to match the impedance of a source with the impedance of a load. Matching the impedance of the source and load enables the maximum amount of power to be transferred from the source to the load for a given signal.

Impedance matching networks in a transceiver are usually coupled between the antenna and the PA and LNA, in order to match the impedance of the antenna to the output impedance of the PA or to the input impedance of the LNA, respectively. The impedance matching networks increase the power efficiency of the transceiver, by enabling the maximum amount of power to be transferred between the antenna and the LNA in a receive (Rx) mode, or the PA and the antenna in a transmit (Tx) mode, for a given signal. A precise impedance matching may thus be used.

However, antenna impedance matching presents particular difficulties in mobile devices, such as mobile handsets, due to the constantly changing environment in which such devices typically operate. The changing environment can result in changes in the antenna impedance, which cause a fixed matching network to be ineffective in providing an optimized impedance match between e.g. the antenna and the front-end circuitry of a transceiver in the mobile device.

Another challengeable issue is the antenna proximity effect, which can significantly degrade the antenna and front-end performance, and hence battery lifetime. In order to reduce the antenna impedance mismatch caused by the proximity effect, adjustable TMNs are used to improve the RF front-end performance. The impedance mismatch detection is useful in such tuning systems in terms of tuning speed and power consumption.

Therefore, there is a need for adjustable TMNs and for an improved method for adjusting an impedance of a TMN.

SUMMARY

In view of the above-mentioned problems and disadvantages, embodiments aim to improve conventional methods of adjusting the impedance of a TMN for a transceiver. In particular, example embodiments may provide a method for adjusting the impedance of the TMN precisely using an impedance correction technique. The TMN is thereby connected between an antenna and a transmitter and receiver of the transceiver, respectively. The intention is to find the optimized matching impedance of the TMN, in order to match the antenna impedance to the transmitter/receiver impedance. Self-adjustment of the TMN impedance should be possible, particularly self-correction of the impedance. However, additional hardware costs should be kept low. The TMN itself should show reduced losses. Further, the TMN should lead to reduced manufacturing costs of the transceiver.

The embodiments provided in the enclosed independent claims may include the features described herein. Additional embodiments are further defined in the dependent claims.

According to a first aspect, the disclosure relates to a method for adjusting an impedance of a tunable matching network, TMN, connected between an antenna and a transceiver front-end, wherein the TMN comprises a receive path to provide signals from the antenna to a receiver during a receive (Rx) mode, and a transmit path to provide signals from a transmitter to the antenna during a transmit (Tx) mode, wherein the method comprises the steps of: tuning the TMN, measuring values of an output DC-offset at the receiver in the Tx mode while tuning the TMN, wherein the output DC-offset is caused by a coupling between the transmitter and the receiver; determining a maximum value of the output DC-offset from the measured output DC-offset values; and adjusting the impedance of the TMN by tuning the TMN to the output DC-offset maximum value.

The method of the first aspect bases on the realization that the coupling between the transmitter and the receiver of the transceiver can be used to obtain an optimized matching impedance between antenna and transmitter/receiver, respectively. The optimized matching impedance is found when the output DC-offset maximum value is reached. In this way, a self-adjustment of the TMN is possible, without needing any additional hardware costs. A correction time in case of an impedance mismatch can be greatly reduced.

The TMN and the improved impedance adjusting of the TMN may reduce cost by finding optimized impedance, thanks to the use of a self-impedance matching detection. Moreover, they may achieve (in addition to small area) low power, thanks to an Rx-based impedance detection method.

Describing the TMN as being connected between the antenna and the transceiver front-end means, in particular, that the TMN is connected between the transmitter and receiver of the transceiver front-end, respectively. Typically, the TMN is also a part of the transceiver front-end, e.g. forming the transceiver front-end's connection to the antenna. It is, however, also possible that transceiver front-end and TMN are separate components.

In an implementation form of the method of the first aspect, the coupling between the transmitter and the receiver is caused by self-mixing.

The self-mixing phenomenon is typically present in transceivers. In particular, cost-sensitive Internet of Things (IOT) applications are vulnerable to this phenomenon. However, the method of the first aspect may leverage the self-mixing phenomenon, in order to determine the optimized matching impedance of the TMN. This may provide a more precise impedance matching, and may also reduce correction times. Further, test costs can be reduced.

In an implementation form of the method of first aspect, the self-mixing is between an output of a local oscillator (LO) of the transmitter and the output of an amplifier, in particular a low noise amplifier (LNA) of the receiver.

In an implementation form of the method of first aspect, the value of the output DC-offset at the receiver is given by:

$$DC_{offset} = A_{LNAin} * k + TIA_{offset} + LPF_{offset},$$
with $k = 0.5 * G_{LNA} * A_{LO}$, wherein $A_{LNAin}$ is an amplitude of an input of an amplifier, in particular a LNA, of the receiver, $TIA_{offset}$ is an offset of a transimpedance amplifier (TIA) of the receiver, $LPF_{offset}$ is an offset of a low-pass filter (LPF) of the receiver, $G_{LNA}$ is a gain of the amplifier, and $A_{LO}$ is an amplitude of a LO of the transmitter.

In an implementation form of the method of first aspect, the TMN comprises at least one tunable capacitor, and tuning the TMN comprises tuning the at least one tunable capacitor.

In an implementation form of the method of first aspect, the TMN comprises a tunable bank, wherein the tunable bank comprises a tunable series capacitor and a tunable shunt capacitor, and tuning the TMN comprises tuning the tunable series capacitor and/or the tunable shunt capacitor.

This may provide for a wide tunability of the TMN.

In an implementation form of the method of first aspect, tuning the TMN comprises tuning the tunable series capacitor and the tunable shunt capacitor independently from another, one after the other.

This may provide for a flexible tunability of the TMN.

In an implementation form of the method of first aspect, the tuning the TMN comprises: fixing a value of a first capacitor of the tunable series capacitor and the tunable shunt capacitor; tuning the second capacitor of the tunable series capacitor and the tunable shunt capacitor, in order to detect a first value of the second capacitor, for which a first maximum value of the output DC-offset is measured; fixing a value of the second capacitor to the first value; tuning the first capacitor, in order to detect a second value of the first capacitor, for which a second maximum value of the output DC-offset is measured; and fixing a value of the first capacitor to the second value.

According to a second aspect, the disclosure relates to a transceiver front-end, comprising: a receiver and a transmitter, a TMN connectable to an antenna and connected to the transmitter and the receiver, wherein the TMN comprises a receive path to provide signals from the antenna to the receiver during a Rx mode, and a transmit path to provide signals from the transmitter to the antenna during a Tx mode, wherein the transceiver front-end is configured to: tune the TMN, measure values of an output DC-offset at the receiver in the Tx mode while tuning the TMN, wherein the output DC-offset is caused by a coupling between the transmitter and the receiver; determine a maximum value of the output DC-offset from the measured output DC-offset values; and adjust the impedance of the TMN by tuning the TMN to the output DC-offset maximum value.

In an implementation form of the transceiver front-end of the second aspect, the TMN comprises at least one tunable capacitor, and the transceiver front-end is configured to tune the at least one tunable capacitor, in order to tune the TMN.

In an implementation form of the transceiver front-end of the second aspect, the TMN comprises a tunable bank, wherein the tunable bank comprises a tunable series capacitor and a tunable shunt capacitor, and the transceiver front-end is configured to tune the tunable series capacitor and/or the tunable shunt capacitor, in order to tune the TMN.

In an implementation form of the transceiver front-end of the second aspect, the transmitter, the receiver, and the TMN are provided on an integrated circuit chip connectable to the antenna via the antenna port of the TMN.

In an implementation form of the transceiver front-end of the second aspect, the TMN comprises an inductance connected in the transmit path, and a mode switch configured to selectively connect the inductance to ground in the Rx mode and disconnect the inductance from ground in the Tx mode.

This may allow the TMN to have a small size since only a single inductor is used. Furthermore, inductive losses may be minimized.

According to a third aspect, the disclosure relates to a transceiver comprising: the transceiver front-end according to the second aspect and any one of the implementation forms thereof, and an antenna connected to the transceiver front-end via the antenna port of the TMN.

The transceiver front-end of the second aspect and the transceiver of the third aspect may provide similar advantages as described above for the method of the first aspect. The transceiver front-end and transceiver can have implementation forms corresponding to the implementation forms of the method of the first aspect.

BRIEF DESCRIPTION OF THE DRAWINGS

The above described aspects and implementation forms of the present disclosure will be explained in the following description of specific embodiments in relation to the enclosed drawings, in which:

FIG. 7A shows a schematic representation of a measured result of power gap between maximum and correlated matching conditions, according to example embodiments.

FIG. 7B shows a schematic representation of a measured result of efficiency gap between maximum and correlated matching conditions, according to example embodiments.

DETAILED DESCRIPTION

Figure 1:
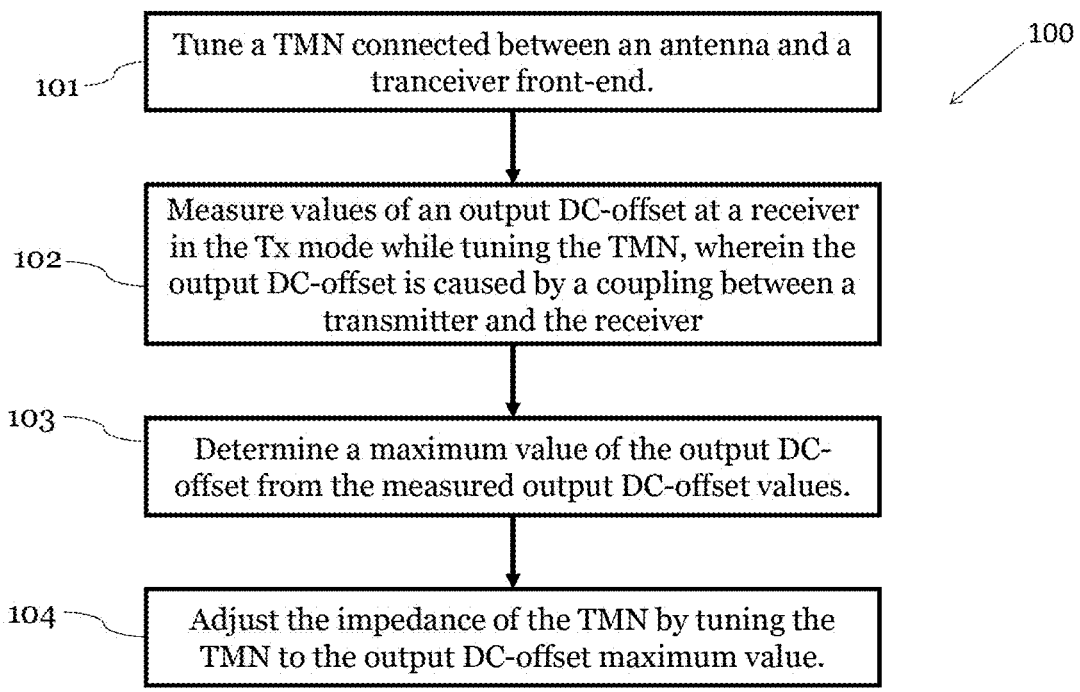
FIG. 1 shows a method for adjusting an impedance of a TMN, according to example embodiments.
Figure 2:
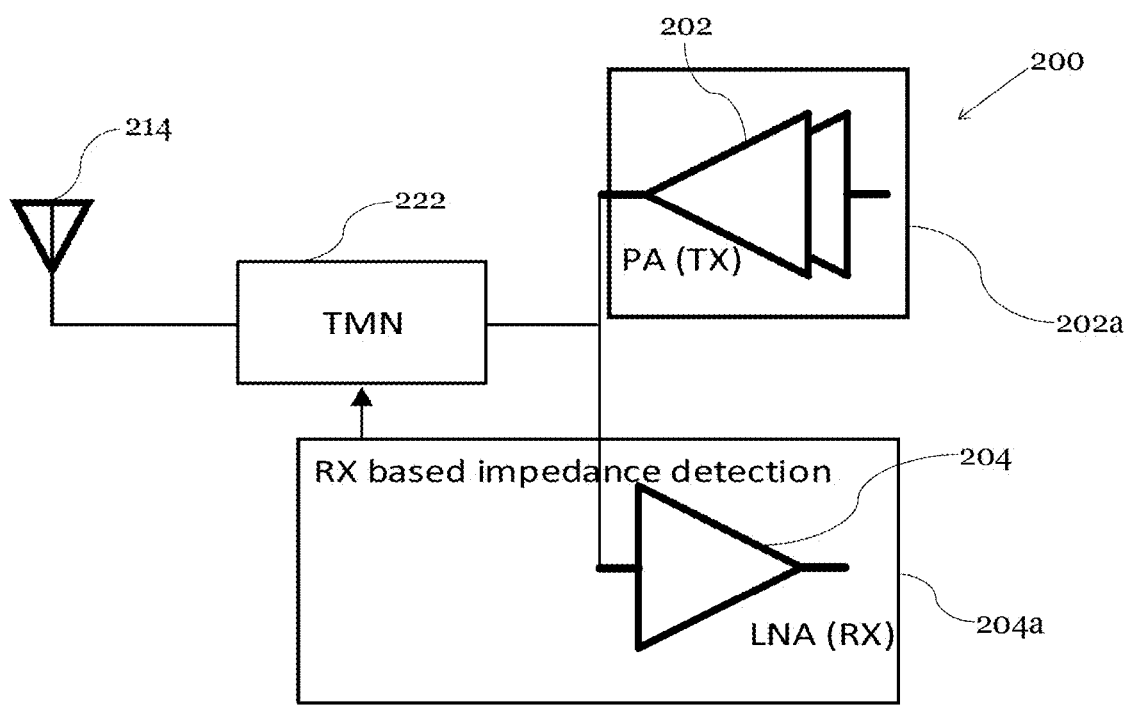
FIG. 2 shows a transceiver comprising a receiver that can be used to adjust an impedance of a TNM, according to example embodiments.

FIG. 1 and FIG. 2 illustrate a method 100 for adjusting an impedance of a tunable matching network TMN 222 according to an embodiment. In particular, FIG. 1 shows a flow-diagram of the steps of the method 100, while FIG. 2 shows a transceiver 200 comprising the TMN 222, wherein the transceiver 200 is capable of performing the method 100.

The TMN 222 is connected between an antenna 214 and a transceiver front-end of the transceiver 200, in particular between the antenna 214 and a receiver 204a and transmitter 202a of the transceiver front-end. The TMN 222 can be part of the transceiver front-end. The TMN 222 comprises a receive path to provide signals from the antenna 214 to the receiver 204a of the transceiver 200, during a Rx mode, and a transmit path to provide signals from the transmitter 202A of the transceiver 200 to the antenna 214, during a Tx mode.

The method 100 comprises in particular the steps of:
Tuning 101 the TMN 222. That is, varying stepwise or continuously the impedance of the TMN 222.
Measuring 102 values of an output DC-offset at the receiver 204a in the Tx mode, while tuning the TMN 222, wherein the output DC-offset is caused by a coupling between the transmitter 202a and the receiver 204a. The output DC-offset value changes when the impedance of the TMN 222 changes
Determining 103 a maximum value of the output DC-offset from the measured output DC-offset values.
Adjusting 104 the impedance of the TMN 222 by tuning the TMN 222 to the output DC-offset maximum value. That is, for instance, after an impedance sweep(s) of the TMN 222 has been conducted, the impedance can be set to the impedance value, at which the highest DC-offset value was determined. FIG. 2 shows the transceiver 200 comprising the receiver 204a, which can be used to adjust the impedance of a TNM 222 according to an embodiment, i.e. according to the method 100.

The TMN 222 is shown particularly as it can be used in the transceiver 200 according to an embodiment. The transceiver 200 may include the TMN 222, and further includes a receiver 204a and a transmitter 202A. Together, the receiver 204a and the transmitter 202A may form the transceiver's front-end. However, also the TMN 222 can belong to the transceiver front-end. The transceiver 200 further includes an antenna 214. The TMN 222 is connected between the antenna 214 and the transceiver front-end.

The TMN 222 according to the embodiment may further comprise an antenna port for connecting to the antenna 214, a receiver port for connecting to the receiver 204a, and a transmitter port for connecting to the transmitter 202A. The TMN 222 has a receive path to provide signals from the antenna port to the receiver port during the Rx mode, and has a transmit path to provide signals from the transmitter port to the antenna port during the Tx mode. The Rx mode and Tx mode may relate to the TMN 222 and transceiver 200, respectively.

In this embodiment of the transceiver 200, the antenna 214 may be directly connected to an input/output (I/O) pin (antenna port) of the transceiver's front-end. The transceiver front-end may include various circuits configured to receive and transmit RF signals via the antenna 214.

In one embodiment, all circuitry used to implement the transceiver front-end may be provided on a common semiconductor substrate, and/or as a monolithic integrated circuit (IC) chip. In another embodiment, one or more components of the transceiver front-end may be provided on a separate substrate, which is coupled or bonded to the IC chip.

In the embodiment shown in FIG. 2, the transceiver front-end includes a first amplifier 204 (belonging to the receiver 204a), a second amplifier 202 (belonging to the transmitter 202A), and the TMN 222.

The first amplifier 204 of the receiver 204a is coupled within the receive path, and the second amplifier 202 of the transmitter 202A is coupled within the transmit path of the transceiver front-end. The first amplifier 204 is configured to amplify RF signals received by the antenna 214, for instance, from a wireless device or base station, during the Rx mode of the transceiver 200.

The second amplifier 202 is configured to amplify RF signals to be transmitted from the antenna 214 to, for instance, another wireless device or base station, during the Tx mode of the transceiver 200. In an example embodiment, the first amplifier 204 of the receiver 204a is a LNA, and the second amplifier 202 of the transmitter 202a is a PA. It is noted, however, that the first 204 and second 202 amplifiers are not strictly limited to LNAs and PAs, and may be implemented with other types of amplifiers in other embodiments.

In an embodiment, the transceiver front-end is a time division duplex (TDD) transceiver front-end. In a TDD transceiver, the transmitter 202A and receiver 204a are not utilized simultaneously (i.e., Tx and Rx modes occur at different times). In order to conserve power in a TDD transceiver, the LNA may be powered down or turned off during the Tx mode, and the PA may be utilized to amply RF signals to be transmitted by the transceiver front-end. During the Rx mode, the PA may be powered down or turned off and the LNA may be utilized to amplify RF signals received by the transceiver front-end.

As shown in FIG. 2, the TMN 222 may be coupled between the antenna 214 and a shared node, to which the first amplifier 204 and the second amplifier 202 are connected. More specifically, the TMN 222 may be directly connected to the I/O pin, and may be directly connected to the shared node, where "directly connected" means that no intervening circuit components are coupled between the recited components.

The transceiver 200 shown in FIG. 2 may include a transceiver front-end of the that includes a single, shared, on-chip TMN 222 to provide the impedance transformations used during the Rx and Tx modes.

In a general embodiment, the TMN 222 may include a plurality of reactive elements (e.g., inductors and/or capacitors), which are configured to transform the impedance of the antenna 214 into a select resistance (R) at the shared node.

In order to provide the impedance transformations used during the Rx and Tx modes, the plurality of reactive elements may generally include at least one variable reactive element having a tunable reactance (or a tunable susceptance), which is reconfigurable to modify the resistance (R) provided at the shared node.

By adjusting the reactance (or susceptance) of the at least one variable reactive element, the TMN 222 shared by the first amplifier 204 and the second amplifier may be reconfigured to: (a) transform the impedance of the antenna 214 into a chosen resistance at the input of the first amplifier during the Rx mode, and (b) transform the impedance of the antenna 214 into a chosen resistance at the output of the second amplifier during the Tx mode. In particular, by adjusting the reactance (or susceptance) of the at least one variable reactive element, the TMN 222 can be tuned 101. During the tuning 101, the DC-offset can be monitored.

The chosen resistance at the input of the first amplifier 204, the chosen resistance at the output of the second amplifier, and the configuration of the TMN 222 may depend on circuitry and operating characteristics of the first amplifier 204 and/or the second amplifier 202.

In general, the at least one variable reactive element may be selected from a group consisting of variable capacitors and/or variable inductors (otherwise referred to as tunable capacitors and/or tunable inductors). In one embodiment, the at least one variable reactive element is implemented as a variable capacitor, and more specifically, as a digitally controlled capacitor array.

Figure 3:
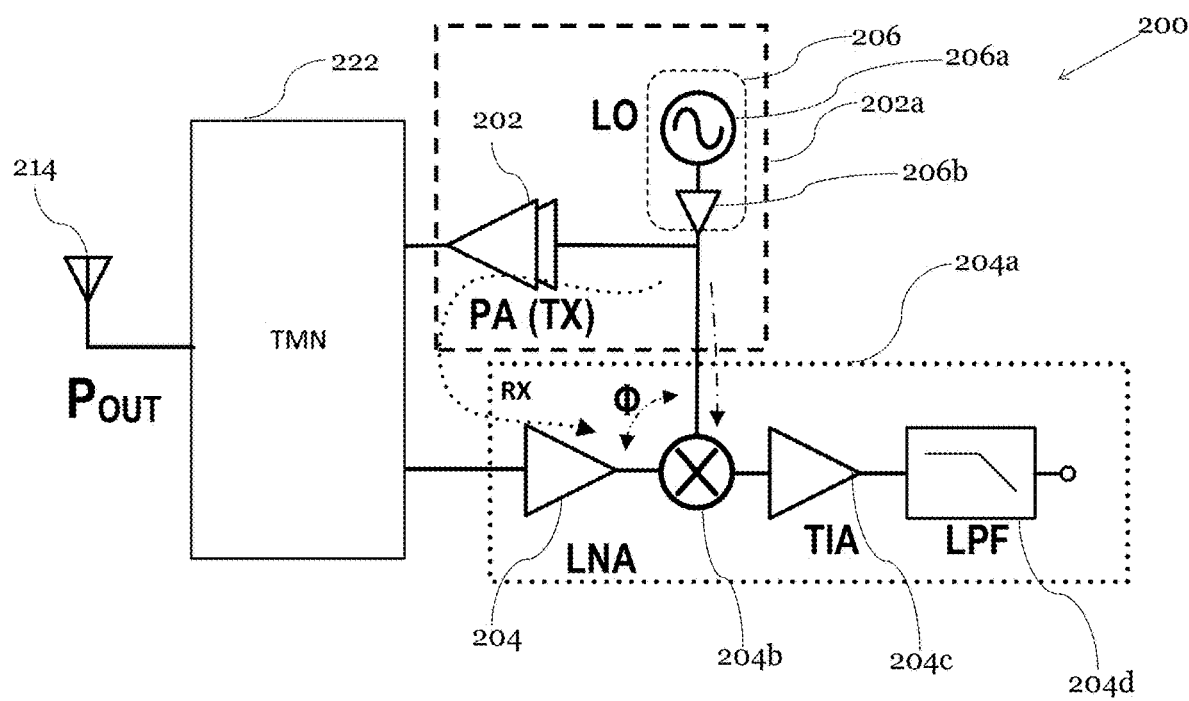
FIG. 3 shows a transceiver comprising a receiver that can be used to adjust an impedance of a TNM, according to example embodiments.

FIG. 3 shows a transceiver 200 comprising the receiver 204a, which can be used to adjust the impedance of the TNM 222 according to an embodiment. FIG. 3 is a more detailed representation of FIG. 2, wherein besides the amplifier 202, the transmitter 202A further comprises a module 206. The module 206 comprising a LO 206a, and an amplifier 206b.

Furthermore, the receiver 204a can comprise the amplifier 204, a TIA 204c, and a LPF 204d.

In an embodiment, the self-mixing occurs between an output of the LO 206a of the transmitter 202A and the output of an amplifier, in particular the LNA 204 of the receiver, as indicated by the cross 204b. This self-mixing can be leveraged to optimize the impedance of the TMN 222 in the transceiver 200.

Figure 4:
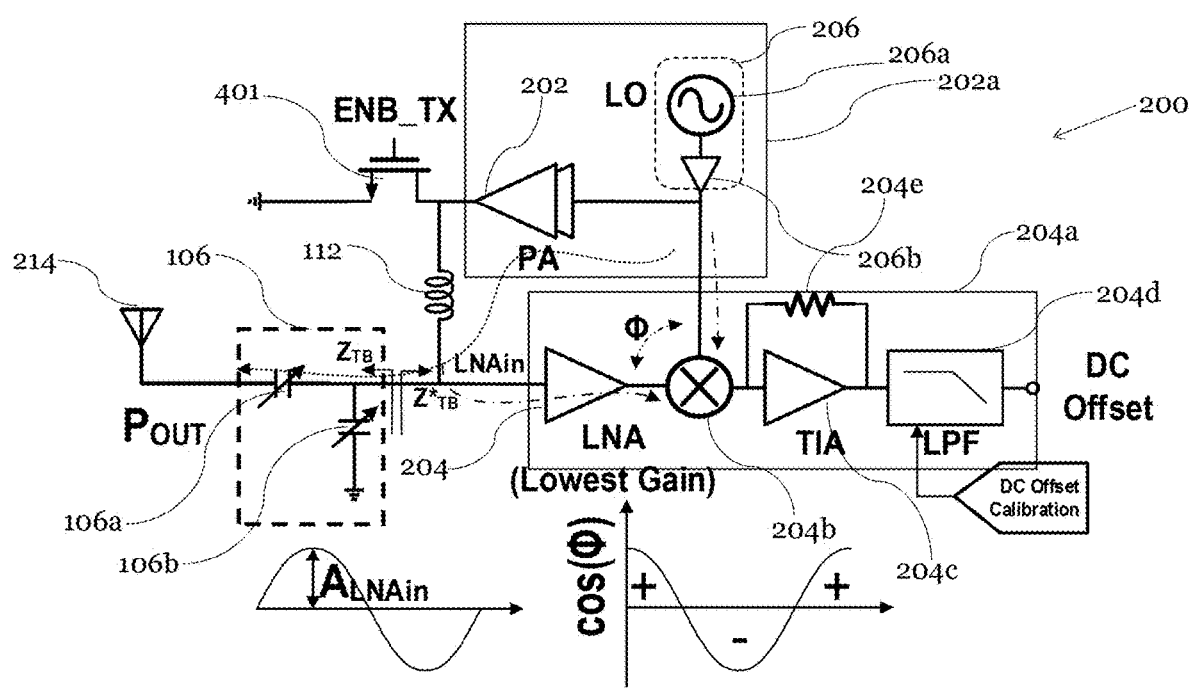
FIG. 4 shows a transceiver comprising a receiver that can be used to adjust an impedance of a TNM, according to example embodiments.

FIG. 4 shows the transceiver 200 comprising the receiver 204a used to adjust the impedance of the TNM 222 according to an embodiment.

FIG. 4 is a more detailed representation of FIG. 3, wherein the TMN 222 comprises a tunable bank 106, which comprises at least one tunable capacitor 106a, 106b, and is connected to the antenna port in a shared part of the receive path and the transmit path.

Notably, the TMN 222 is generally shared for matching the impedance of the transmitter 202a and the receiver 204a, respectively, to the impedance of the antenna 214.

Furthermore, the TMN 222 comprises an inductance 112 connected in the transmit path between the tunable bank 106 and the transmitter port. The TMN 222 also comprises a device configured to connect the inductance 112 to ground in the Rx mode, and to disconnect the inductance 112 from ground in the Tx mode.

The device can be implemented by one of a mode switch 401, as in FIG. 4, configured to connect the inductance 112 to ground or a capacitance for notch filter in the Rx mode or a balun with a capacitance for notch in Rx-mode (equivalent circuit)

The mode switch 401 can be big-sized, in order to ensure that the Q-factor of the TMN 222 is not degraded.

In FIG. 4, the TMN 222 comprises the tunable bank 106, the mode switch 401, and the inductance 112. The tunable bank 106 can be used to tune 101 the impedance of the TMN 222 while monitoring the DC-offset.

The tunable bank 106 can consist of at least one tunable capacitor 106a, 106b, wherein the tunable capacitors 106a, 106b can be tuned by an impedance detection unit (not shown in FIG. 4). In particular, the tunable bank 106 can consist of a tunable series capacitor 106a and a tunable shunt capacitor 106b, wherein the tunable series capacitor 106a is connected to the antenna port, and the tunable shunt capacitor 106b is connected to ground and is arranged after the tunable series capacitor 106a. In one embodiment, the tunable series capacitor 106a and the tunable shunt capacitor 106b are tunable independently from another. The one or more tunable capacitors 106a, 106b can be tuned, in order to tune 101 the impedance of the TMN 222 while monitoring the DC-offset.

In an embodiment, the inductance 112 may be the only inductance 112 included in the TMN 222, and the inductance 112 may be connected between the receiver port and the transmitter port.

In order to further reduce the area of the transceiver 200, embodiments of the present disclosure may comprise a single-inductor topology, as shown in FIG. 4. The merged Tx/Rx TMN 222 in this case may have the mode switch ($SW_O$) 401, which is located outside of the signal path, so that the signal loss is dramatically reduced.

The tunability of the proposed TMN 222 may be provided by the (shared) tunable bank (TB) 106, comprising a series capacitor (CSE) 106a and a shunt (CSH) capacitor 106b. In some embodiments, in the proposed matching topology with only one on-chip inductor 112, the area and the loss of the TMN 222 are minimized.

By targeting the typical impedance area of pattern antennas and selecting the impedance seen from the TB 106 to the PA 202 and the LNA 204 (Z*TB_PA and Z*TB_LNA) in the capacitive region, a wide impedance coverage can be achieved with a capacitive only TB 106 and a single inductor 112.

Moreover, in another embodiment, the mode switch 401 may be located outside of the transmit path and the receive path, respectively, and in the Tx mode, the mode switch 401 may provide a fringe capacitance between ground and the inductance 112.

To be able to self-adjust the impedance of TMN 222, the loop-back antenna matching impedance detection and correction technique based on the self-mixing can be used, as illustrated in FIG. 4 and as described already above.

Zero-IF receivers are widely used in many cost-sensitive IoT applications, since they are free from image rejection and complex LO generation. However, they are vulnerable to the self-mixing, which is proportional to magnitude of two mixer inputs, LNA and LO output.

In some embodiments, the self-mixing phenomenon is leveraged and the optimized matching impedance can be detected. During the Tx matching impedance detection, the LNA 204 may operate at the lowest gain to minimize the power consumption for the impedance detection and to avoid saturation. Since the delays introduced by LNA 204 ($t_{LNA}$), PA 202 ($t_{PA}$) and TMN 222 (tTmN) are relatively small compared to one LO period ($t_{LO}$), the phase difference ($\varphi$) between the mixer's LO 206a and RF port is close to zero.

Hence, the RX output DC offset can be approximated as:

$$DC\ \text{offset} = A_{LNAin} * k + TIA\text{offset} + LPF\text{offset} \tag{1}$$

$$k = 0.5 * G_{LNA} * A_{LO} \tag{2}$$

where $A_{LNAin}$, TIAoffset, LPFoffset, $G_{LNA}$ and $A_{LO}$ are amplitude of LNA input, TIA and LPF DC offset, LNA gain and amplitude of LO, respectively.

The DC offset due to the self-mixing can be used to detect the LNA input magnitude $A_{LNAin}$. Since $A_{LNAin}$ has a linear relationship with the PA output amplitude ($P_{OUT}$), the detected DC offset also indicates the level of PA output power. This indicates a quality of the matching impedance of the TMN 222 with respect to antenna 214 and transceiver front-end. The DC offset can be monitored while tuning the TMN 222, in particular while adjusting at least one tunable capacitor 106 of the TMN 222.

Figure 5:
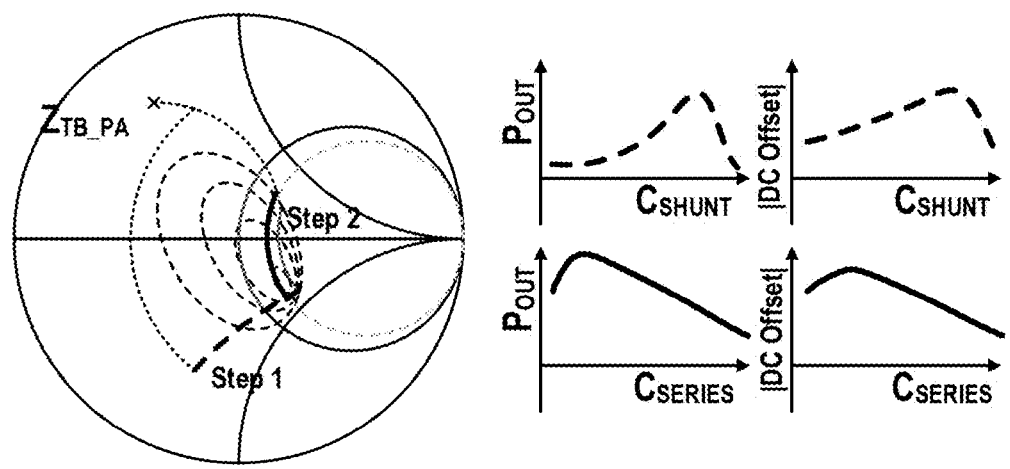
FIG. 5 shows an impedance of a receiver $Z_{TB\_PA}$ of a transceiver, power $P_{OUT}$ and DC-offset of two capacitors of a TMN of the transceiver, according to example embodiments.

FIG. 5 shows an impedance of a receiver $Z_{TB\_PA}$ of a transceiver, power $P_{OUT}$ and DC-offset of the two capacitors 106a, 106b of the TMN 222 of the transceiver 200 according to an embodiment.

As described in FIG. 5, the matching impedance detection and correction method can have two steps:

First, $C_{SHUNT}$ is swept while $C_{SERIES}$ is fixed in order to detect for an optimized value (i.e., $C_{SH\_OPT}$) by finding the maximum DC offset.

Then, $C_{SHUNT}$ is fixed to $C_{SH\_OPT}$, and $C_{SERIES}$ is swept till the optimized value $C_{SE\_OPT}$ is found.

This can also be performed vice-versa.

In some embodiments, compared to alternative exhaustive detection methods, the detection time and hardware complexity are dramatically reduced from 2(M*N) to 2M+2N, where M and N are the bit widths of $C_{SERIES}$ and $C_{SHUNT}$ control, respectively.

Although the proposed method detects only Tx matching, the same setting is also reused in the $R_x$ matching. Since Z*TB_PA and Z*TB_LNA are designed to be as close as possible in the capacitive area, and the sensitivity of the $R_x$NF to the impedance variation is much lower than PA output power, a same setting is applied in both $T_x$ and $R_x$ mode with a very limited impact.

Figure 6:
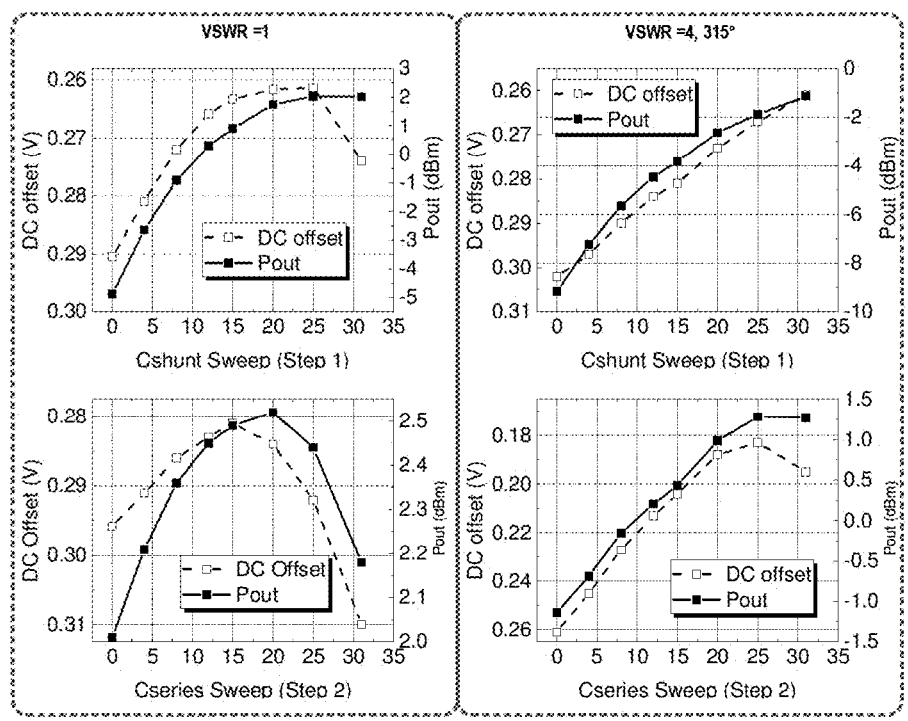
FIG. 6 shows power $P_{OUT}$ and DC-offset of two capacitors of a TMN in a transceiver, according to example embodiments.

FIG. 6 shows power $P_{OUT}$ and DC-offset of the two capacitors 106a, 106b of the TMN 222 in the transceiver 200 according to an embodiment, FIG. 7A shows a schematic representation of a measured result of power gap between maximum and correlated matching condition according to an embodiment, and FIG. 7B shows a schematic representation of a measured result of efficiency gap between maximum and correlated matching condition according to an embodiment.

The present disclosure has been described in conjunction with various embodiments, as examples, as well as aspects and implementations. However, other variations can be understood and effected by those skilled in the art and practicing the claims, from the studies of the drawings, this disclosure and the independent claims. In the claims as well as in the description the word "comprising" does not exclude other elements or steps and the indefinite article "a" or "an" does not exclude a plurality.

What is claimed is:

1. A method for adjusting an impedance of a tunable matching network (TMN) connected between an antenna and a transceiver front-end, wherein the TMN comprises a receive path to provide signals from the antenna to a receiver during a receive (Rx) mode and a transmit path to provide signals from a transmitter to the antenna during a transmit (Tx) mode, wherein the method comprises the steps of:
    tuning the TMN;
    measuring values of an output DC-offset at the receiver in the Tx mode while tuning the TMN, wherein the output DC-offset is caused by a coupling between the transmitter and the receiver;
    determining a maximum value of the output DC-offset from the measured output DC-offset values; and
    adjusting the impedance of the TMN by tuning the TMN to the output DC-offset maximum value.

2. The method of claim 1, wherein the coupling between the transmitter and the receiver is caused by self-mixing.

3. The method of claim 2, wherein the self-mixing is between an output of a local oscillator (LO) of the transmitter and the output of an amplifier of the receiver, and wherein the amplifier of the receiver comprises a low-noise amplifier (LNA).

4. The method of claim 1, wherein the value of the output DC-offset at the receiver is given by:

$$DC_{offset} = A_{LNAin} * k + TIA_{offset} + LPF_{offset}, \text{ with}$$
$$k = 0.5 * G_{LNA} * A_{LO}, \text{ wherein:}$$

$A_{LNAin}$ is an amplitude of an input of an amplifier of the receiver the input amplifier of the receiver comprises a low-noise amplifier (LNA), $TIA_{offset}$ is an offset of a transimpedance amplifier (TIA) of the receiver, $LPF_{offset}$ is an offset of a low-pass filter (LPF) of the receiver, $G_{LNA}$ is a gain of the amplifier, and ALO is an amplitude of the LO of the transmitter.

5. The method of claim 1,
    wherein the TMN comprises at least one tunable capacitor, and
    wherein tuning the TMN comprises tuning the at least one tunable capacitor.

6. The method of claim 1,
    wherein the TMN comprises a tunable bank,
    wherein the tunable bank comprises a tunable series capacitor and a tunable shunt capacitor, and
    wherein tuning the TMN comprises tuning the tunable series capacitor or the tunable shunt capacitor.

7. The method of claim 6, wherein tuning the TMN comprises tuning the tunable series capacitor and the tunable shunt capacitor independently from another, one after the other.

8. The method of claim 7, wherein tuning the TMN comprises:
    fixing a value of a first capacitor of the tunable series capacitor and the tunable shunt capacitor;
    tuning a second capacitor of the tunable series capacitor and the tunable shunt capacitor in order to detect a first value of the second capacitor for which a first maximum value of the output DC-offset is measured;
    fixing a value of the second capacitor to the first value;
    tuning the first capacitor in order to detect a second value of the first capacitor for which a second maximum value of the output DC-offset is measured; and
    fixing a value of the first capacitor to the second value.

9. A transceiver front-end, comprising:
    a receiver;
    a transmitter; and
    a tunable matching network (TMN) connectable to an antenna and connected to the transmitter and the receiver,
    wherein the TMN comprises a receive path to provide signals from the antenna to the receiver during a receive (Rx) mode and a transmit path to provide signals from the transmitter to the antenna during a transmit (Tx) mode, and
    wherein the transceiver front-end is configured to:
        tune the TMN;
        measure values of an output DC-offset at the receiver in the Tx mode while tuning the TMN, wherein the output DC-offset is caused by a coupling between the transmitter and the receiver;
        determine a maximum value of the output DC-offset from the measured output DC-offset values; and
        adjust an impedance of the TMN by tuning the TMN to the output DC-offset maximum value.

10. The transceiver front-end of claim 9, wherein:
the TMN comprises at least one tunable capacitor, and
the transceiver front-end is configured to tune the at least one tunable capacitor in order to tune the TMN.

11. The transceiver front-end of claim 9, wherein:
the TMN comprises a tunable bank,
the tunable bank comprises a tunable series capacitor and a tunable shunt capacitor, and
the transceiver front-end is configured to tune the tunable series capacitor or the tunable shunt capacitor in order to tune the TMN.

12. The transceiver front-end of claim 9, wherein the transmitter, the receiver, and the TMN are provided on an integrated circuit chip connectable to the antenna via an antenna port of the TMN.

13. The transceiver front-end of claim 9, wherein:
the TMN comprises an inductance connected in the transmit path, and
a mode switch is configured to selectively connect the inductance to ground in the Rx mode and disconnect the inductance from ground in the Tx mode.

14. A transceiver comprising:
the transceiver front-end comprising:
  a receiver;
  a transmitter; and
  a tunable matching network (TMN) connectable to an antenna and connected to the transmitter and the receiver,
  wherein the TMN comprises a receive path to provide signals from the antenna to the receiver during a receive (Rx) mode and a transmit path to provide signals from the transmitter to the antenna during a transmit (Tx) mode, and
  wherein the transceiver front-end is configured to:
    tune the TMN;
    measure values of an output DC-offset at the receiver in the Tx mode while tuning the TMN, wherein the output DC-offset is caused by a coupling between the transmitter and the receiver;
    determine a maximum value of the output DC-offset from the measured output DC-offset values; and
    adjust an impedance of the TMN by tuning the TMN to the output DC-offset maximum value; and
an antenna connected to the transceiver front-end via an antenna port of the TMN.

15. The transceiver of claim 14, wherein:
the TMN comprises at least one tunable capacitor, and
the transceiver front-end is configured to tune the at least one tunable capacitor in order to tune the TMN.

16. The transceiver of claim 14, wherein:
the TMN comprises a tunable bank,
the tunable bank comprises a tunable series capacitor and a tunable shunt capacitor, and
the transceiver front-end is configured to tune the tunable series capacitor or the tunable shunt capacitor in order to tune the TMN.

17. The transceiver of claim 14, wherein the transmitter, the receiver, and the TMN are provided on an integrated circuit chip connectable to the antenna via an antenna port of the TMN.

18. The transceiver of claim 14, wherein:
the TMN comprises an inductance connected in the transmit path, and
a mode switch is configured to selectively connect the inductance to ground in the Rx mode and disconnect the inductance from ground in the Tx mode.

* * * * *